Figure 1:
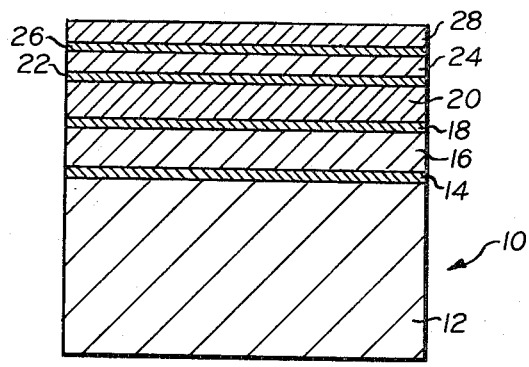

United States Patent [19]
Silverman

[11] 3,798,037
[45] Mar. 19, 1974

[54] PHOTOGRAPHIC COLORING ELEMENT AND PROCESS

[76] Inventor: Avrum Silverman, 2809 Avenue K, Brooklyn, N.Y. 11210

[22] Filed: Aug. 11, 1971

[21] Appl. No.: 170,880

[52] U.S. Cl............................. 96/74, 96/9, 96/22, 96/59
[51] Int. Cl. ....... G03c 1/40, G03c 5/50, G03c 5/08
[58] Field of Search................. 96/74, 9, 22, 23, 59

[56] References Cited
UNITED STATES PATENTS

| | | | |
|---|---|---|---|
| 2,203,656 | 6/1940 | MacAdam | 96/5 |
| 2,218,229 | 10/1940 | Carroll | 96/5 |
| 2,336,380 | 12/1943 | Wilmanns | 96/74 |
| 2,805,158 | 9/1957 | Ganguin | 96/74 |

Primary Examiner—Norman G. Torchin
Assistant Examiner—Alfonso T. Suro Pico
Attorney, Agent, or Firm—Ryder, McAulay, Fields, Fisher & Goldstein

[57] ABSTRACT

A film for producing a color image from a monochromatic image comprising at least a first layer of emulsion having a color coupler for producing a negative or a positive image in a first color of the monochromatic image. A second layer of emulsion has a second type of color coupler for producing an image in a second color with luminances reversed with respect to the image formed in the first layer. The two additional layers of emulsion each contain the same type of color coupler so that the two additional layers produce a positive masked negative image or a negative masked positive image of the monochromatic image in a third color whereby the developed film produces a colored image of the monochromatic image.

A novel process for producing the colored image from the monochromatic image is also disclosed.

20 Claims, 2 Drawing Figures

PATENTED MAR 19 1974

3,798,037

INVENTOR
AVRUM SILVERMAN
BY
Paul Fields
ATTORNEY.

PHOTOGRAPHIC COLORING ELEMENT AND PROCESS

This invention relates generally to a photographic coloring element and a process therefore and, more particularly, pertains to an element for rendering a colored image from a monochromatic or a black and white image and a novel process for accomplishing the same.

Present techniques for generating a colored image from a colorless or black and white source image usually require the use of expensive and complex equipment, as well as the utilization of processes which must be performed by a skilled technician in laboratory surroundings under controlled conditions. Thus, in the photographic field color separation transparency records and various combinations of exposures from light sources of different frequencies for both taking and viewing the picture are necessary to produce a multicolored image from a black and white or monochromatic source image. As a result, such pictures are extremely costly to produce.

Accordingly, an object of this invention is to provide an improved photographic color process.

A more specific object of the present invention is to provide a photosensitive element which produces a colored image from a monochromatic source image which is simple to produce.

A further object of the present invention is the provision of a film for producing colored images from a black and white source which may be utilized for medical purposes to produce a colored image of portions of the body to facilitate the interpretation of X-rays, for example.

Another object of this invention resides in the novel details of construction which provides a photosensitive element of the type described which produces a realistic and attractive colored image from a colorless source image.

Accordingly, a photosensitive element for producing a colored image from a monochromatic image constructed according to the present invention comprises a film having at least a first layer means for producing a positive image of said monochromatic image in a first color. Second and third layer means is provided for producing a negative masked positive image of the monochromatic image in a second color. Additionally, fourth layer means is provided for producing a negative of the monochromatic image in a third color, whereby the developed film produces a realistic colored picture of the monochromatic image.

A feature of the present invention is to provide a method for producing a colored image from a colorless or monochromatic source image in a simple and easy manner.

Figure 2:
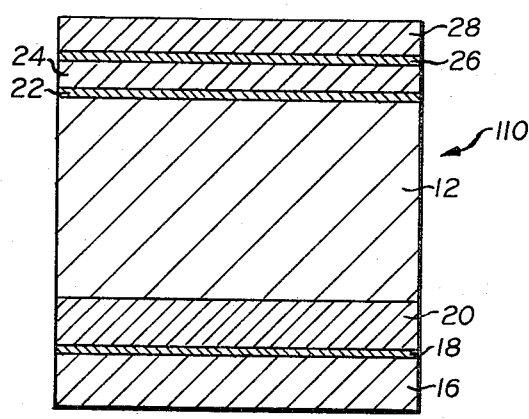

Other features and advantages of the present invention will become more apparent from a consideration of the following detailed description when taken in conjunction with the accompanying drawing, in which:

FIG. 1 is a sectional view, to an enlarged scale, of a photosensitive element constructed in accordance with the present invention; and FIG. 2 is a sectional view, to an enlarged scale, of a modified embodiment of a photosensitive element of the type shown in FIG. 1.

Before discussing the element and method of the present invention, it is believed that a brief review of the principles of reversal color film will facilitate an understanding and appreciation of the present invention. Accordingly, where a picture of a colored scene is taken with conventional color reversal film and the color red is present in the original scene, after processing the color red is transmitted through the film but the colors blue and green are absorbed. When the color blue is present in the original scene, after processing the blue color is transmitted through the film but the red and green colors are absorbed. Similar comments apply where the color green is present in the original scene. That is, the green color is transmitted through the film but the red and green colors are absorbed.

In effect, this action may be thought of as producing three natural opposites. To be more specific, the action may be thought of as having the red color opposite the blue and green colors; the blue color opposite the red and green colors; and the green color opposite the red and blue colors, as in a natural color triangle wherein each color is positioned at a different apex.

The present invention, however, is not directed to a colored scene but a black and white or monochromatic scene which may be present in either a negative or a positive. Thus, two apexes of the color triangle red, green, and blue may be derived from the respective negative and the positive of the black and white or monochromatic image. That is, the black and white image, which may be a negative for example, permits the production of a positive which is the opposite of the negative image in gray scale, (i.e., the luminances are reversed). On the other hand, if one begins with a black and white positive image, a negative image may be derived therefrom which is the opposite or reversed in gray scale of the positive image. As a result, as noted above, the negative and positive images being opposite in gray scale may be used as two apexes of an artificial color triangle.

In accordance with the present invention, the third apex of the artificial color triangle is produced by a positive masked negative image or a negative masked positive image. These masking images are produced in such a manner as to provide a substantially third opposite in gray scale to the gray scale of a normal positive and the gray scale of a normal negative.

The primary colors red, green, and blue are then assigned to the three opposite images so produced. For example, the positive image may be produced in a minus-red layer of emulsion, the negative image may be produced in the minus-blue layer of emulsion, and the negative masked positive, may be produced in two minus-green layers of emulsion. (It is to be noted that this assignment of color values is for illustrative purposes only and is not to be interpreted as being a limitation of the present invention. That is, the invention contemplates any combination of the assignment of color values. Thus, the positive may be produced in the minus-blue layer and the negative may be produced in the minus-red layer, for example.)

A consideration of the above illustrates that, in effect, a color opposition arrangement has been produced which is analogous to the color opposition arrangement produced by conventional reversal color film. That is, the positive image (which is transmitted by the minus-red layer in the example under consideration) will have luminances opposite to the negative image (which is transmitted by the minus-blue layer) and the composite masked image (which is transmitted by the two minus-green layers).

If the colored images are superposed one on the other it will be obvious that a complete range of colors can be produced from the monochromatic tones of the original black and white image. While it is also obvious that the colors so produced will not correspond exactly to the colors in the original scene, it has been found that they are nevertheless realistic and attractive and are translated in a logical progression.

It is to be noted that conventional black and white photography deals with the rendering of colors in an original scene into monochrome according to their visual luminosities. The present invention deals with the converse; the rendering of monochromatic tones in colors according to their visual luminosities. That is, the invention relates to a subtractive color film and process for translating varying shades of gray recorded on black and white film into hues of color on the new film wherein each hue of color corresponds to a respective shade of gray, white, or black.

More specifically, FIG. 1 illustrates a photosensitive element which will render a black and white or monochromatic image as a colored image upon development. Although in the discussion which follows it will be assumed that the element of FIG. 1 is a film to be used with a black and white negative to produce a color transparency, it is to be understood that instead of a film the same construction may be utilized as printing paper, in which case the support may be changed so that it is a white reflecting paper base, as noted in greater detail below. Moreover, it is obvious that, the element may be used with a black and white positive, in which case the types of images produced in the emulsion layers as noted below will be reversed (i.e., a negative image will be produced in a layer which produces a positive image when the film is used in conjunction with a black and white positive).

The photosensitive element of FIG. 1 is designated generally by the reference numeral 10 and includes a support 12. The support 12 may be a conventional safety film made of cellulose acetate, or cellulose butyrate, or polyester. If the element 10 is to be used as a printing paper the support 12 may be a white reflecting paper base. Alternatively, the support 12 may be a white-pigmented plastic sheet made of opaque cellulose acetate.

Mounted on the support 12 is a layer 14 of colloidal silver which serves as a conventional antihalation backing and is bleached away during processing. Deposited or superposed on the layer 14 is a first emulsion layer 16 which is a thick coating of extremely low contrast panchromatic emulsion and contains color couplers. The layer 16 yields, upon development, an extremely low contrast positive dye image which may be cyan in the example under consideration.

Deposited or superposed on the layer 16 is a plan gelatine interlayer 18. Deposited or superposed on the layer 18 is a second emulsion layer 20 which is a thick coating of extremely high contrast panchromatic emulsion and contains color couplers. The layer 20 yields upon development, an extremely high contrast positive dye image, which may be magenta in the example under consideration.

Deposited on the layer 20 is a layer of colloidal silver 22 which serves as a conventional yellow filter and is bleached away during processing. Deposited or superposed on the layer 22 is a third emulsion layer 24 which is a thin coating of extremely high contrast panchromatic emulsion and contains color couplers. The layer 24 yields, upon development, an extremely high contrast negative dye image, which may be magenta in the example under consideration.

Deposited or superposed on the layer 24 is a plain gelatine interlayer 26. Deposited or superposed on the layer 26 is a fourth emulsion layer 28 which is a thin coating of extremely low contrast panchromatic emulsion and contains color couplers. The layer 28 yields, upon development, an extremely low contrast negative dye image, which may be yellow in the example under consideration.

The layers 20 and 24 produce a magenta image in the example under consideration. However, the image produced in the layer 20 is a positive image while the image produced in the layer 24 is a negative image. Thus, the layers 20 and 24 may be thought of as collectively forming a composite layer which produces what may be termed a negative masked positive image. Alternatively, if the film 10 were used with a positive the layers 20 and 24 would produce a positive masked negative image.

The emulsions used with the present invention may be sensitive to the entire visible spectrum of light. They contain a light sensitive silver halide, plus a coupler which is capable of reacting with oxidized developer to produce a dye of the appropriate color. The developer used is capable of the coupling action which produces dye images, as well as reducing the exposed silver halide grains to metallic silver.

The bottom two emulsion layers 16 and 20 should be thicker than the top two emulsion layers 24 and 28, because comparable image areas must be developed twice in the bottom two emulsion layers while only once in the top two emulsion layers. The structure of the element 10 is such as to yield upon reversal development two positive dye images in the respective layers 16 and 20, and two negative dye images in the respective layers 24 and 28, inseparably superposed on the same support 12.

The element 10 is exposed and processed according to the following procedure:

A black and white negative (or positive, as noted above) is printed by contact or enlargement onto the element 10. This first exposure is made with white light which penetrates and records in the four emulsion layers 16, 20, 24, and 28. The antihalation backing 14 prevents the blurring of the image. The element is then passed through a first developer to reduce the exposed silver halide grains in all four emulsions to metallic silver. The thinner top emulsions, layers 24 and 28, receive full development during the development time interval but the thicker bottom emulsions, layers 16 and 20, are only partially developed during this interval. The reduction of layers 16 and 20 is completed later. However, it is to be understood that enough silver halide and color couplers remain in these image areas in the bottom emulsion layers 16 and 20, to react with the color developer later in the processing. The element 10 then is passed through a stop bath which neutralizes the developer and halts its action.

The element is thereafter evenly fogged in blue light which affects only the top emulsion layers 24 and 28. The yellow filter 22 prevents the blue light from reaching the bottom emulsions, layers 16 and 20. The element is then passed through a color developer which reduces the newly exposed silver halide grains in the top emulsion layers 24 and 28, and completes the reduction of the remaining silver halide grains in the bottom emulsion layers 16 and 20. At the same time, the developer forms suitable dyes by reaction with the couplers incorporated in all four emulsion layers. The element is thereafter passed through a stop bath which neutralizes the developer and halts its action. The element 10 is then subjected to a bleaching solution which converts all of the silver in the element to silver bromide. This includes the yellow filter 22 and the antihalation backing 14 which are both made of colloidal silver. A conventional fixing solution (hypo) removes all of the silver bromide leaving only the dye images in layers 16, 20, 24, and 28.

Thus, when the processing is completed the top emulsion layers 24 and 28, which received the second exposure with blue light, will be reversed to negative dye images while the bottom emulsion layers 16 and 20, which received only the initial exposure will have yielded positive dye images.

(Formulations for developing solutions, bleaching solutions, and stop baths may be found in the text entitled "Developing; The Negative Technique," copyright 1966 by Focal Press Limited, printed in Great Britian by Charles Birchall and Sons Ltd., London, 16th Edition, edited by C. I. Jacobson.)

The relative contrasts of the respective negatives and positives in the respective image layers specified above are critical and may be established by the following method. Layers 16 and 28 are fabricated of a slow speed emulsion designed to be underexposed in the time allowed for exposure, and layers 20 and 24 are fabricated of a fast speed emulsion designed to be overexposed in the time allowed for exposure. Additionally, layers 16 and 28 are fabricated of an emulsion constituted to develop slowly thus being underdeveloped in the time allowed for development, and layers 20 and 24 are fabricated of an emulsion constituted to develop quickly thus being overdeveloped in the time allowed for development. Underexposure and underdevelopment will result in a low contrast image of the type required while over-exposure and overdevelopment will result in a high contrast image of the type required.

Additionally, emulsion layers 16 and 28 are manufactured of low contrast material with too long an exposure range for the average black and white negative, and emulsion layers 20 and 24 are manufactured of high contrast material with too short an exposure range for the average black and white negative. Taking the example of a negative with an opacity range of 31 to 1 to be printed on a color paper of the present invention; emulsion layers 16 and 28 should have an exposure range of 40 to 1, too long a range for the negative resulting in a low contrast image while emulsion layers 20 and 24 should have an exposure range of 24 to 1, too short a range for the negative resulting in a high contrast image.

Thus as indicated in FIG. 1, emulsion layers 16 and 28 are manufactured of low contrast material with a disposition toward underexposure and underdevelopment while emulsion layers 20 and 24 are manufactured of high contrast material with a disposition toward overexposure and overdevelopment. By processing positive layer 16 (in the example under consideration) to an extreme low contrast and positive layer 20 to an extremely high contrast, and negative layer 24 to an extremely high contrast and negative layer 28 to an extremely low contrast, their respective gray scales and equivalent dye densities are deformed in a systematic way. The purpose of this deformation of the gray scales and equivalent dye densities is directed toward producing the weighted values, and, therefore, the resulting color translation shown in Table I below.

TABLE I

| A | B | C | D | E | F | G | H |
|---|---|---|---|---|---|---|---|
| Gray Scale Normal Positive | Gray Scale Normal Negative | High Contrast Positive Magenta | High Contrast Negative Magenta | Negative Masked Positive Magenta (Green) | Low Cont. Pos. Cyan (Red) | Low Cont. Neg. Yellow (Blue) | Res. Color Trans. |
| White 8/8 | Black 0 | 8/8 | 0 | 0 | 6/8 | 0 | Red |
| 7/8 | 1/8 | 8/8 | 2/8 | 2/8 | 5/8 | 0 | Oran. |
| 6/8 | 2/8 | 8/8 | 4/8 | 4/8 | 4/8 | 0 | Yel. |
| 5/8 | 3/8 | 8/8 | 6/8 | 6/8 | 3/8 | 1/8 | Yel.Gr. |
| 4/8 | 4/8 | 8/8 | 8/8 | 8/8 | 2/8 | 2/8 | Green |
| 3/8 | 5/8 | 6/8 | 8/8 | 6/8 | 1/8 | 3/8 | Bl.Gr. |
| 2/8 | 6/8 | 4/8 | 8/8 | 4/8 | 0 | 4/8 | Cyan |
| 1/8 | 7/8 | 2/8 | 8/8 | 2/8 | 0 | 5/8 | Gr.Bl. |
| Black 0 | White 8/8 | 0 | 8/8 | 0 | 0 | 6/8 | Blue |

Accordingly, column A illustrates a gray scale for a normal positive and column B illustrates a gray scale for normal negative. Columns C, D, F, and G correspond to the dye images formed in the respective layers after development. Thus, column C corresponds to the magenta image formed in layer 20 while column D corresponds to the magenta image formed in adjacent layer 24. The theoretical effect or summation of layers 20 and 24 is summarized in column E which illustrates the negative masked positive. Column F corresponds to the cyan image formed in layer 16 while column G corresponds to the yellow image formed in layer 28. Column H is the resulting color translation of a particular shade of gray, white, or black.

Ideally, in the high contrast positive (column C) the highlights are blank and many tones toward the end of the scale are also blank lacking density. Other tones contrast with each other. The high contrast negative (column D) has the luminances reversed. Ideally, in the low contrast positive (column F) the brightest highlights will be denser than normal with the shadows becoming opaque with density. Other tones are flat with little contrast. The low contrast negative (column G) has the luminances reversed. The high contrast positive (column C) and high contrast negative (column D) mask each other, and create what is in effect a completely new scale of transmittance (column E). Reading across columns C, D, and E line by line reveals that the lower weighted value in columns C and D always acts as a "light valve" for the higher weighted value in columns C and D, thereby creating a new value in column E. (It should be noted that these weighted values are ideal and only approximate.)

Therefore, reading across line 1 shows that column E, which summarizes the theoretical effect of columns C and D, will transmit no discernible green light. On the other hand, the image represented by column F will transmit red light. However, since column F is a low contrast scale, the red light will be of less intensity than if column F were of a high contrast. Column G reveals genta, and cyan to this system of color translation allows of various combinations of positive, negative, and negative masked positive. The three most useful combinations are detailed in Tables I, II, and III. Table II below is similar to Table I but illustrates the results obtained when column C corresponds to the cyan image formed in layer 20, column D corresponds to the cyan image formed in layer 24, column F corresponds to the yellow image formed in layer 16, and column G corresponds to the magenta image formed in layer 28. In a similar manner, Table III below illustrates the results obtained when column C corresponds to the yellow image formed in layer 20, column D corresponds to the yellow image formed in layer 24, column F corresponds to the magenta image formed in layer 16, and column G corresponds to the cyan image formed in layer 28.

TABLE II

| A | B | C | D | E | F | G | H |
|---|---|---|---|---|---|---|---|
| Gray Scale Normal Positive | Gray Scale Normal Negative | High Contrast Positive Cyan | High Contrast Negative Cyan | Negative Masked Positive Cyan (Red) | Low Cont. Pos. Yellow (Blue) | Low Cont. Neg. Magenta (Green) | Res. Color Trans. |
| White 8/8 | Black 0 | 8/8 | 0 | 0 | 6/8 | 0 | Blue |
| 7/8 | 1/8 | 8/8 | 2/8 | 2/8 | 5/8 | 0 | Red Bl. |
| 6/8 | 2/8 | 8/8 | 4/8 | 4/8 | 4/8 | 0 | Magenta |
| 5/8 | 3/8 | 8/8 | 6/8 | 6/8 | 3/8 | 1/8 | Bl.Red |
| 4/8 | 4/8 | 8/8 | 8/8 | 8/8 | 2/8 | 2/8 | Red |
| 3/8 | 5/8 | 6/8 | 8/8 | 6/8 | 1/8 | 3/8 | Orange |
| 2/8 | 6/8 | 4/8 | 8/8 | 4/8 | 0 | 4/8 | Yellow |
| 1/8 | 7/8 | 2/8 | 8/8 | 2/8 | 0 | 5/8 | Yel.Gr. |
| Black 0 | White 8/8 | 0 | 8/8 | 0 | 0 | 6/8 | Green |

TABLE III

| A | B | C | D | E | F | G | H |
|---|---|---|---|---|---|---|---|
| Gray Scale Normal Positive | Gray Scale Normal Negative | High Contrast Positive Yellow | High Contrast Negative Yellow | Negative Masked Positive Yellow (Blue) | Low Cont. Pos. Magenta (Green) | Low Cont. Neg. Cyan (Red) | Res. Color Trans. |
| White 8/8 | Black 0 | 8/8 | 0 | 0 | 6/8 | 0 | Green |
| 7/8 | 1/8 | 8/8 | 2/8 | 2/8 | 5/8 | 0 | Bl.Gr. |
| 6/8 | 2/8 | 8/8 | 4/8 | 4/8 | 4/8 | 0 | Cyan |
| 5/8 | 3/8 | 8/8 | 6/8 | 6/8 | 3/8 | 1/8 | Gr.Bl. |
| 4/8 | 4/8 | 8/8 | 8/8 | 8/8 | 2/8 | 2/8 | Blue |
| 3/8 | 5/8 | 6/8 | 8/8 | 6/8 | 1/8 | 3/8 | RedBl. |
| 2/8 | 6/8 | 4/8 | 8/8 | 4/8 | 0 | 4/8 | Mag. |
| 1/8 | 7/8 | 2/8 | 8/8 | 2/8 | 0 | 5/8 | Bl.Red |
| Black 0 | White 8/8 | 0 | 8/8 | 0 | 0 | 6/8 | Red | that no discernible blue light will be transmitted by the image represented thereby. Thus for line 1 where only red light is transmitted, the resulting translation will be red.

Similarly, the bottom line of the table shows that the image represented by column E will transmit no discernible green light and column F will transmit no discernible red light. On the other hand column G will transmit blue light. However, since column G is a low contrast scale, the blue light will be of less intensity then if column G represented a high contrast image. Thus, for the bottom line where only blue light is transmitted, the resulting translation will be blue. In between red and blue, varying hues will be produced as shown in column H. (The resultant color of column H is obtained by adding the weighted values of columns E, F, and G.)

Assigning the subtractive primaries of yellow, ma-

If it is desired to print from a positive, as with motion pictures for example, the exposures are made in the same manner as, in printing from a negative. However, after processing, the top emulsion layers 24 and 28 will have been reversed to positive dye images while the bottom emulsions, layers 16 and 20, will have yielded negative dye images. Therefore, the resulting color translation will be exactly the reverse of what obtained when printing from a negative. That is, column H of Tables I, II, and III will be turned bottom to top and top to bottom. Thus it is possible to obtain two different results from each film or paper; one translation using a negative as the source image and a second using a positive as the source. If the film is manufactured in three types according to Tables I, II, and III, then it is possible to produce six different color translations, one of which will be appropriate for the black and white scene depicted.

While the present invention has been disclosed as a print film for existing photographic material, it is to be noted that the element 10 in FIG. 1 may also be utilized as camera film for original photography. For example in the field of animated movies, if the artwork is shaded according to the graduated steps of a gray scale, then black and white drawings can be translated into color. Additionally, the element may be utilized in the field of medical thermography using the standard Barnes camera. The heat patterns of the human body can then be translated into color thermographs.

FIG. 2 illustrates a modified embodiment of the present invention which may be utilized in the field of medical radiography to produce a colored X-ray film. Thus the element of FIG. 2, which is designated generally by the reference numeral 110, is similar to the element 10 and similar numbers indicate identical features. However, the safety film support 12 of FIG. 2 is interposed between the layers 20 and 22. Additionally, the antihalation backing is dispensed with. Also, the emulsion layers 16, 20, 24, and 28 are fabricated to have maximum sensitivity to the fluorescence of calcium tungstate rather than to X-rays per se. The element 110 is placed between calcium tungstate intensifying screens which fluoresce under the action of X-rays, the film being exposed on both sides.

While preferred embodiments of the invention have been shown and described herein, it will become obvious that numerous omissions, changes, and additions may be made in such embodiments without departing from the spirit and scope of the present invention. For example, a cyan filter may be substituted for the yellow filter in which case the second exposure would be made with red light. Similarly, a magenta filter may be substituted for the yellow filter in which case the second exposure would be made with green light. As a further example, the exact order of the low and high contrast layers may be interchanged. Thus, instead of the first and fourth layers being low contrast and the second and third layers being high contrast, the contrasts may be reversed. Alternatively, the first and third layers may be low contrast and the second and fourth layers may be high contrast, or the contrasts in the layers of this latter example may be reversed, etc.

Similarly, the exact location of the composite negative-positive masking images (both of which are the same color) may be changed. These composite masking images need not be confined to the second and third layers but may comprise the first and fourth layers. Alternatively, the composite masking images may comprise the first and third or the second and fourth layers, etc.

Additionally, the four emulsions need not be panchromatic but may be sensitized to different colors of the visible spectrum. Thus, the first emulsion may be made sensitive to red and blue, the second to green and blue, the third to blue, and the fourth also to blue. The film may then be printed by white light, and given a second exposure in blue light resulting in reversal of the two blue sensitive emulsions.

Moreover, the emulsion layers may be made sensitive to a different portion of the spectrum rather than visible light. For instance, all four emulsions may be made sensitive to infra-red, ultraviolet, or X-rays.

Alternatively, the top two emulsions may be subjected to solarization rather than being reversal processed. That is, during manufacture the film may be flashed to blue light of sufficient intensity to produce the maximum developable density in the top two emulsions. The film may then be exposed to a negative source image by white light, followed by color development. Thus two negative dye images (solarized) and two positive dye images (unsolarized) may be produced on the same support without recourse to a second development.

While the present invention has been describd and illustrated as a film or paper comprising silver halide, it is to be emphasized that the invention is also applicable to non-silver photographic systems. Thus, utilizing the methods and principles discussed herein colored images may be produced using thermoplastic materials or electrostatic reproducing means, for example.

What is claimed is:

1. A photosensitive element for producing a colored image from a monochromatic source image comprising at least four light-sensitive silver halide emulsion layers, one of said layers having a color coupler for producing a low contrast positive image of said source image in a first color out of the colors cyan, magenta and yellow; another two of said layers having the same color couplers in each layer for producing a high contrast positive image and a high contrast negative image of said source image in a second color of said colors cyan, magenta and yellow; the other of said layers having a color coupler for producing a low contrast negative image of said source image in a third color of said colors cyan, magenta and yellow.

2. A photosensitive element as in claim 1, and a film supporting layer for supporting said four silver halide emulsion layers.

3. A photosensitive element as in claim 1, in which said one and other silver halide emulsion layers are fabricated of low contrast material with a long exposure range and a disposition toward underexposure and underdevelopment, and said two silver halide emulsion layers are fabricated of high contrast material with a short exposure range and a disposition toward overexposure and overdevelopment.

4. A photosensitive element as in claim 2, in which the bottommost two silver halide emulsion layers are separated by a gelatine layer and the uppermost two silver halide emulsion layers are separated by a gelatine layer.

5. A photosensitive element as in claim 1, in which said four silver halide emulsion layers are panchromatic.

6. A photosensitive element as in claim 1, in which said four silver halide emulsion layers are sensitive to the same spectral region other than visible light.

7. A photosensitive element as in claim 1, in which the bottommost two silver halide emulsion layers are thicker than the uppermost two silver halide emulsion layers.

8. A photosensitive element as in claim 2, in which said element further comprises an anti-halation layer.

9. A photosensitive element for producing a colored image from a monochromatic source image and the like comprising at least a first layer silver halide emulsion having a color coupler for producing a negative image of said source image in a first color out of the colors cyan, magenta and yellow; second and third layer silver halide emulsions having the same color coupler for producing a negative image and a positive image both of said source image in a second color of said colors cyan, magenta and yellow; and a fourth layer silver halide emulsion having a color coupler for producing a positive image of said source image in a third color of said colors cyan, magenta and yellow; said second and third layers producing images having a contrast different from the images produced in the other two of said layers.

10. A photosensitive element as in claim 9, and a color filter between said second and third layers for preventing the passage of light of a preselected color therethrough.

11. A photosensitive element as in claim 10, and a film support between said filter and said second layer.

12. A photosensitive element as in claim 9, in which said first and second layers are thicker than said third and fourth layers.

13. A photosensitive element as in claim 9, in which said first and fourth layer emulsions include means for producing extremely low contrast images, and said second and third layer emulsions include means for producing extremely high contrast images.

14. A photosensitive element as in claim 13, in which said first layer is mounted on an antihalation layer comprising colloidal silver.

15. A photosensitive element as in claim 7, in which said uppermost two silver halide emulsion layers are separated from said bottommost two silver halide emulsion layers by a filter layer comprising colloidal silver.

16. The method of producing a colored image from a monochromatic source image which comprises exposing to said source image a photosensitive element having four light-sensitive layers of silver halide and color couplers in each of said layers thereon and which is capable of producing in different layers a low contrast positive image in a first color of the colors cyan, magenta and yellow, a high contrast positive image and a high contrast negative image both in the same second color of the colors cyan, magenta and yellow, and a low contrast negative image in a third color of the colors cyan, magenta and yellow; developing the photosensitive element in an ordinary non-staining first developer, a second exposure of only the top two layers, developing the photosensitive element in a second developer which produces four dye images in said first, second and third colors associated with silver images; and removing the silver images and any remaining silver halide.

17. The method of claim 16, in which said silver images and silver halide are removed by treating said element with a bleaching solution, and thereafter subjecting said element to a fixing bath.

18. The method of claim 16, wherein the element is subjected to a neutralizing solution after treating said element with the first developer, and the second developer.

19. The method of claim 16, in which the second exposure of said film or paper element is made from the top with a light source having a color which is absorbed by a color filter situated between the second and third layers of said element.

20. A photosensitive element as in claim 1, in which said four silver halide emulsion layers comprise emulsions selectively sensitive to red and blue, green and blue, blue, and blue.

* * * * *